(12) United States Patent
Nakamura

(10) Patent No.: US 8,144,393 B2
(45) Date of Patent: Mar. 27, 2012

(54) STEREOMICROSCOPE WITH CAMERA FOR ASSISTANT

(75) Inventor: Katsushige Nakamura, Tokyo (JP)

(73) Assignee: Mitaka Kohki Co., Ltd., Tokyo (JP)

( * ) Notice: Subject to any disclaimer, the term of this patent is extended or adjusted under 35 U.S.C. 154(b) by 0 days.

(21) Appl. No.: 13/070,042

(22) Filed: Mar. 23, 2011

(65) Prior Publication Data

US 2011/0170178 A1    Jul. 14, 2011

Related U.S. Application Data

(62) Division of application No. 11/835,748, filed on Aug. 8, 2007, now abandoned.

(30) Foreign Application Priority Data

Aug. 9, 2006 (JP) .................................. 2006-217083

(51) Int. Cl.
G02B 21/22 (2006.01)
(52) U.S. Cl. ........................................ 359/376; 359/368
(58) Field of Classification Search .................. None
See application file for complete search history.

(56) References Cited

U.S. PATENT DOCUMENTS

| | | | |
|---|---|---|---|
| 4,448,498 A | 5/1984 | Muller et al. | |
| 4,688,907 A * | 8/1987 | Kleinberg | 359/377 |
| 5,067,804 A | 11/1991 | Kitajima et al. | |
| 5,337,177 A | 8/1994 | Toyoda et al. | |
| 5,668,661 A | 9/1997 | Tomioka | |
| 6,473,229 B2 | 10/2002 | Nakamura | |
| 6,525,878 B1 | 2/2003 | Takahashi | |
| 2001/0010592 A1 | 8/2001 | Nakamura | |
| 2004/0017607 A1 | 1/2004 | Hauger et al. | |
| 2007/0127115 A1 | 6/2007 | Hauger et al. | |

FOREIGN PATENT DOCUMENTS

| | | |
|---|---|---|
| DE | 102004059143 | 6/2006 |
| EP | 1120676 | 8/2001 |
| EP | 1333305 | 8/2003 |
| JP | 2607828 | 2/1997 |
| JP | 11-244301 | 9/1999 |
| JP | 2001-117049 | 4/2001 |
| JP | 2001-133690 | 5/2001 |
| JP | 2001-208979 | 8/2001 |
| WO | 2005/096059 | 10/2005 |

* cited by examiner

*Primary Examiner* — Arnel C Lavarias
(74) *Attorney, Agent, or Firm* — Greenblum & Bernstein P.L.C.

(57) ABSTRACT

A stereomicroscope includes a microscope main body and a camera for assistant. The microscope main body includes therein an objective optical system, a zoom optical system and an eyepiece optical system. The camera for assistant is detachably mounted to the microscope main body. The microscope main body provides to a main operator a pair of optical images including a certain binocular disparity as viewed from an observation direction of the main operator. The camera for assistant provides to an assistant a pair of electron images including a certain binocular disparity as viewed from an observation direction of the assistant. The observation directions of the main operator and the assistant cross at a certain angle. The camera for assistant outputs the pair of electron images into a stereo viewer which is separated from the microscope main body.

4 Claims, 4 Drawing Sheets

STEREOMICROSCOPE WITH CAMERA FOR ASSISTANT

CROSS-REFERENCE TO RELATED APPLICATION

The present application is a division of U.S. application Ser. No. 11/835,748, filed Aug. 8, 2007, which claims priority under 35 U.S.C. §119 of Japanese Patent Application No. 2006-217083, the disclosures of which incorporated herein by reference in their entireties.

BACKGROUND OF THE INVENTION

1. Field of the Invention

The present invention relates to a stereomicroscope, and more specifically to a stereomicroscope provided with a camera for assistant which is detachably mounted to the stereomicroscope.

2. Description of the Related Art

A stereomicroscope for use in a cranial nerve surgery or the like introduces beams reflected on a surgical portion into beam introduction holes provided at a lower portion of a microscope main body. The introduced beams are guided to right and left eyes of a main operator through an objective optical system, a zoom optical system and an eyepiece optical system. This allows the main operator to observe a zoomed surgical portion by his/her naked eyes.

The main operator generally performs a surgical operation in cooperation with an assistant. This requires a lateral vision scope provided at a side face of the microscope main body. The assistant can perform the assistance for the surgical operation while observing a zoomed surgical portion by his/her naked eyes, using the lateral vision scope. A conventional lateral vision scope is disclosed in Japanese Patent Application Laid-open No. H11-244301.

A beam splitter guides into the lateral vision scope a part of beams to be guided to right and left eyes of a main operator in a stereomicroscope. Thereby, an assistant can observe a zoomed surgical portion by his/her naked eyes. The assistant can not however observe a stereoscopic zoomed surgical portion because the beam splitter guides only the part of beams into the lateral vision scope. Further, since the lateral vision scope is provided at the side face of the microscope main body, the lateral vision scope moves together with the microscope main body when the main operator tilts the microscope main body. This requires the assistant to always care about the movement of the microscope main body by the main operator.

In order to resolve the above problem, as disclosed in Japanese Patent Application Laid-open No. 2001-117049, a new device is developed to realize that a main operator and an assistant perform a surgical operation while observing a stereoscopic zoomed surgical portion simultaneously. In the new device, an optical image is converted into an electron image by a stereographic camera including an objective optical system and a zoom optical system therein. The electron image is displayed on a plurality of stereo viewers (stereo display devices) supported independent from the stereographic camera, in real-time. The main operator and the assistant simultaneously observe the stereoscopic zoomed surgical portion through the electron image displayed on these stereo viewers. According to the new device, even if the main operator tilts the stereographic camera, the assistant observes the stereoscopic zoomed surgical portion without caring about the movement of the stereographic camera by the main operator because his/her stereo viewer is supported independent from the stereographic camera.

However, since the stereographic camera includes no eyepiece optical system in the new device, the main operator can not observe the zoomed surgical portion through an optical image by his/her naked eyes. Therefore, with respect to the new device, there is a requirement that the main operator wants to observe the zoomed surgical portion through the optical image by his/her naked eyes because he/she is forced to observe the zoomed surgical portion through the electron image by an assistant's side reason.

It is hoped to develop a stereomicroscope configured to allow a main operator to observe a zoomed surgical portion through an optical image by his/her naked eyes by using an eyepiece optical system in a microscope main body and allow an assistant to observe the zoomed surgical portion through an electron image by his/her naked eyes by using a stereographic camera and a stereo viewer.

Usually, an assistant is located at a side of a main operator and an observation direction of the assistant for observing a zoomed surgical portion differs from an observation direction of the main operator for observing the zoomed surgical portion at about 90 degrees. This requires optical processing for one pair of beams which is guided to the main operator side and for another pair of beams which is guided to the assistant side and orthogonal to the one pair of beams, in a microscope main body into which a camera for assistant is built into.

SUMMARY OF THE INVENTION

The present invention has an object to provide a stereomicroscope configured to allow a main operator to observe a zoomed surgical portion through an optical image by his/her naked eyes and allow an assistant to observe the zoomed surgical portion through an electron image with a stereo viewer, without building a camera for assistant into a microscope main body.

In order to achieve the above object, the present invention provides a stereomicroscope comprising: a microscope main body including therein an objective optical system, a zoom optical system and an eyepiece optical system; and a camera for assistant detachably mounted to the microscope main body, wherein the microscope main body provides to a main operator a pair of optical images including a certain binocular disparity as viewed from an observation direction of the main operator, the camera for assistant provides to an assistant a pair of electron images including a certain binocular disparity as viewed from an observation direction of the assistant, the observation directions of the main operator and the assistant cross at a certain angle, and the camera for assistant outputs the pair of electron images into a stereo viewer which is separated from the microscope main body.

According to the present invention, since the microscope main body includes therein the objective optical system, the zoom optical system and the eyepiece optical system, the main operator can obtain the pair of optical images including a certain binocular disparity as viewed from the observation direction of the main operator to stereoscopically observe a zoomed surgical portion by his/her naked eyes. Thus, the microscope main body includes only minimum optical systems therein, which allows the configuration of the microscope main body to be simply and easily produced. When the assistant wants to observe the zoomed surgical portion with the stereo viewer, the camera for assistant is mounted to the microscope main body. The camera for assistant captures the pair of electron images including a certain binocular disparity as viewed from the observation direction of the assistant and then outputs the pair of electron images into the stereo viewer. Thus, the assistant can stereoscopically observe the zoomed surgical portion in the observation direction different from the observation direction of the main operator.

In a preferred embodiment of the present invention, the observation directions of the main operator and the assistant cross at about right angles.

According to the embodiment, a direction of binocular disparity of the pair of electron images differs from one of the pair of optical images at about right angles. Thus, the observation direction of the assistant corresponds to a general observation direction, which provides a user-friendly observation apparatus to the assistant.

In a preferred embodiment of the present invention, the camera for assistant includes an objective optical system and a zoom optical system which are independent from the microscope main body.

According to the embodiment, the camera for assistant includes the objective optical system and the zoom optical system which are independent from the microscope main body. Thus, these optical systems can be controlled independent from or in conjunction with the microscope main body, which provides a user-friendly operation to the assistant.

DESCRIPTION OF THE PREFERRED EMBODIMENTS

Figure 1:
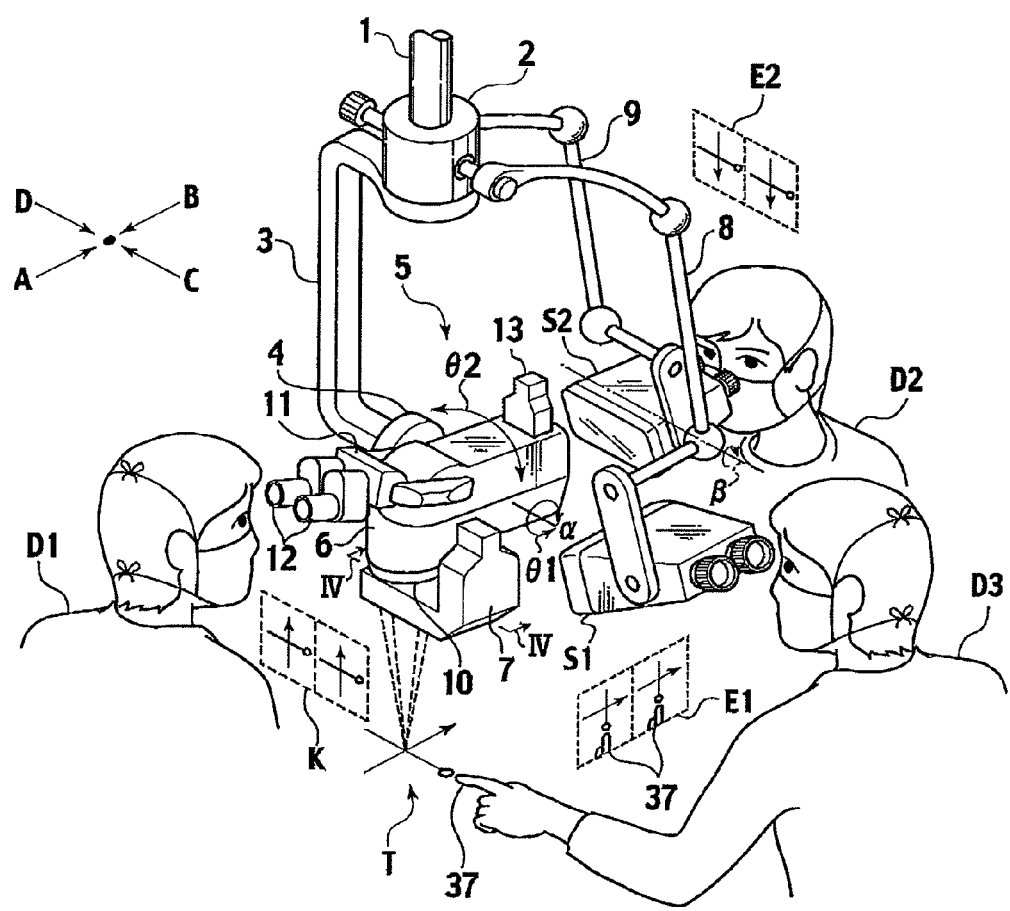
FIG. 1 is a perspective view illustrating a state where one main operator and two assistants use a stereomicroscope system according to an embodiment of the present invention.
Figure 2:
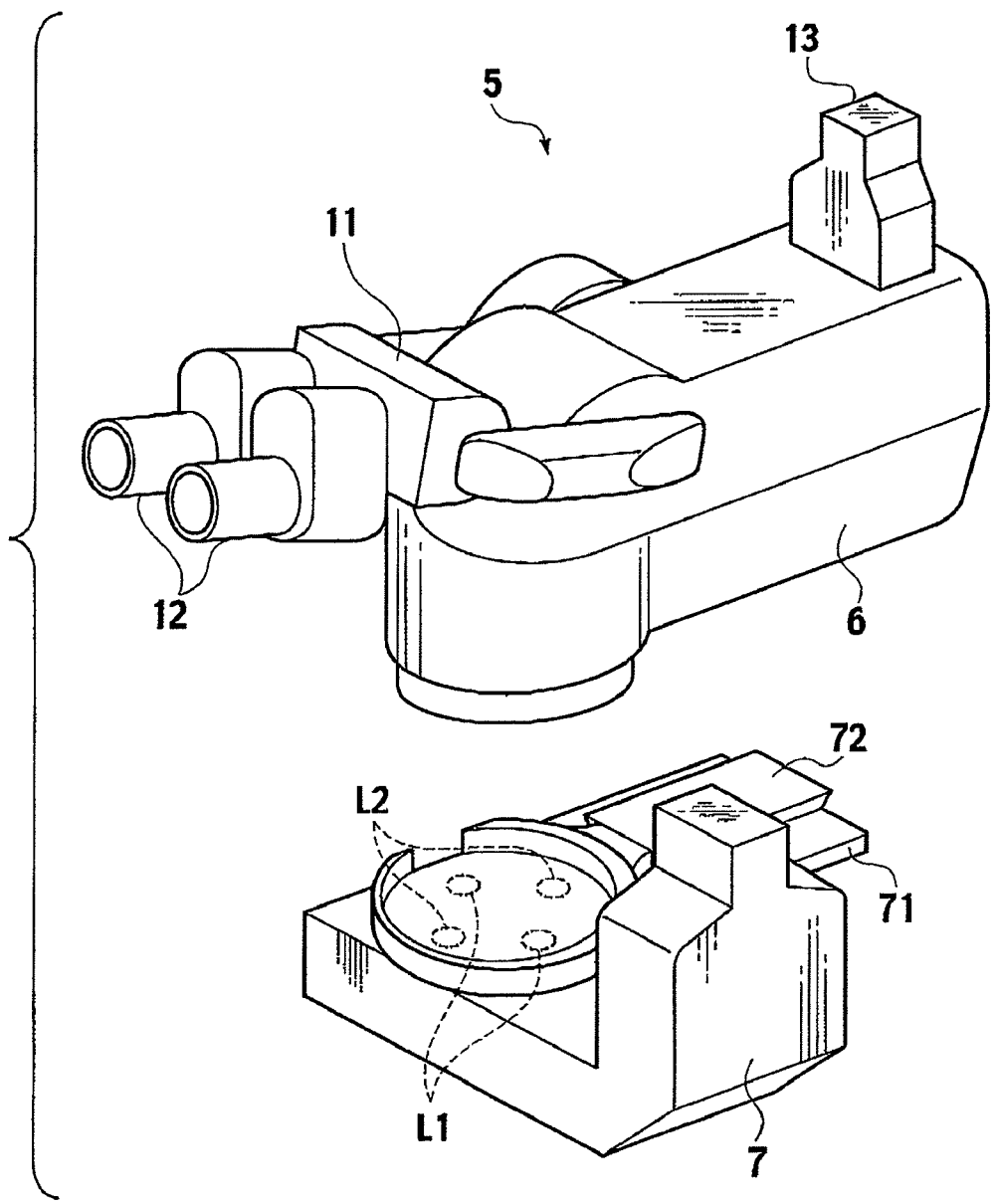
FIG. 2 is a schematic perspective view of a part of the stereomicroscope according to the embodiment of the present invention.
Figure 3:
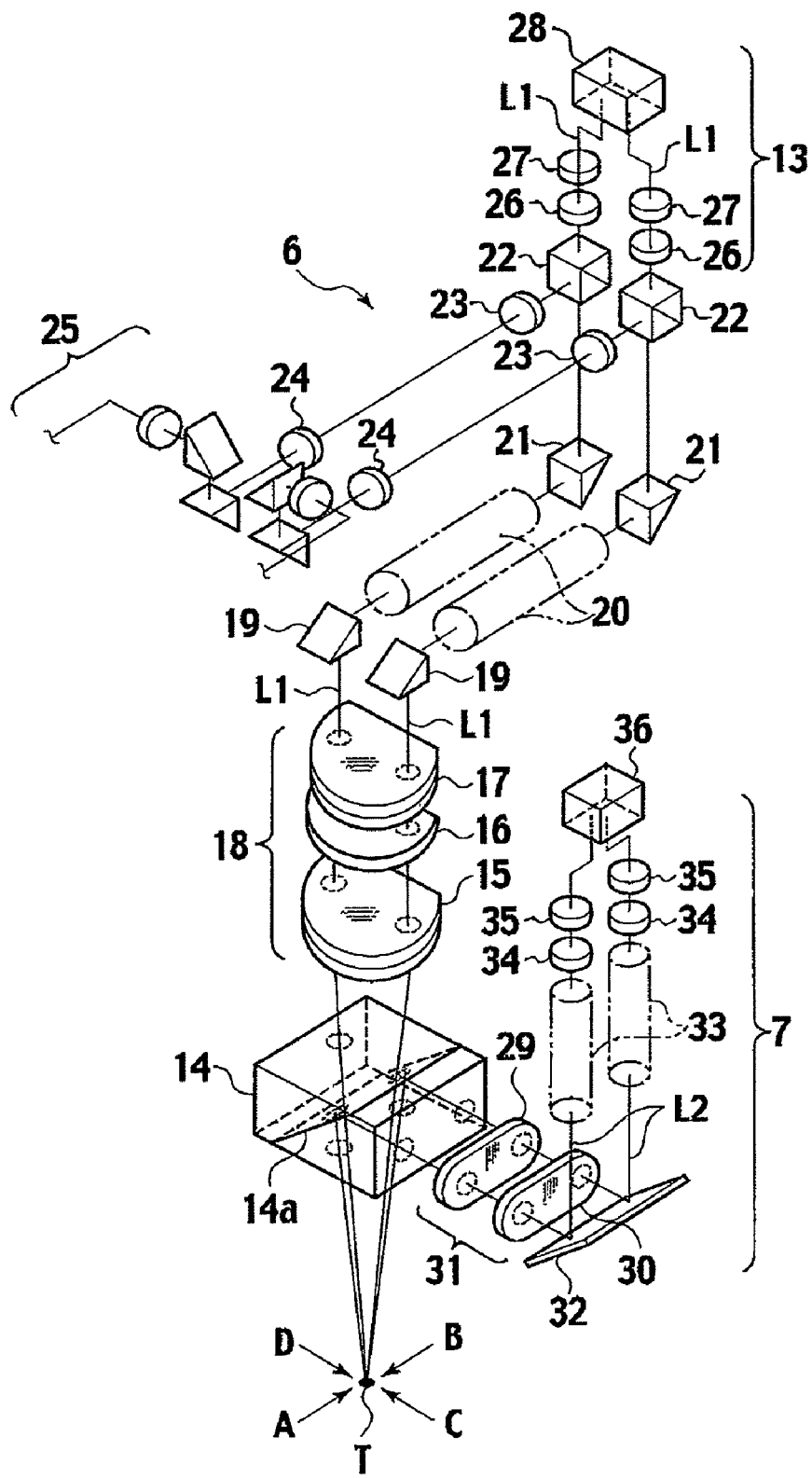
FIG. 3 is an exploded perspective view illustrating optical systems of a microscope main body and a camera for assistant according to the embodiment of the present invention.

A stereomicroscope system according to an exemplary embodiment of the present invention will be described below in detail, with reference to FIGS. 1 to 4. In FIGS. 1 and 3, a direction A is an observation direction of a main operator D1. A direction B is opposed to the direction A and an observation direction of an assistant (a person opposed to the main operator D1) D2. In this embodiment, the directions A and B are defined as an anteroposterior direction of the stereomicroscope system. It is noted that the main operator D1 side and the assistant D2 side are a front side and a rear side, respectively. A direction C is positioned at right side with respect to the direction A and orthogonal to the direction A. The direction C is an observation direction of an assistant D3. A direction D is opposed to the direction C and an observation direction of an assistant (a person opposed to the assistant D3) (not shown). In this embodiment, the directions C and D are defined as a horizontal direction of the stereomicroscope system. It is noted that the assistant D3 side and the not-shown assistant side are a right side and a left side, respectively.

The stereomicroscope system comprises a stand apparatus (not shown), a top link 1, a support arm 3, an electromagnetic clutch 4, a stereomicroscope 5 and holding arms 8 and 9. The top link 1 is mounted to the stand apparatus placed on a floor of an operating room. The top link 1 can be moved at arbitrary position while keeping a state where the top link 1 is orthogonal to the floor.

The support arm 3 has a substantial U-letter shape and is mounted to a lower portion 2 of the top link 1. The stereomicroscope 5 is supported at a lower portion of the support arm 3 via the electromagnetic clutch 4. The stereomicroscope 5 can be rotated about an axis α in the anteroposterior direction (θ1 direction) and tilted in the horizontal direction (θ2 direction), by a support configuration of the electromagnetic clutch 4.

The stereomicroscope 5 comprises a microscope main body 6, a camera 7 for assistant, a movable tube 11, a pair of eyepiece portions 12 and 12, a camera 13 for assistant, stereo viewers S1 and S2 and an illuminating means (not shown).

The stereo viewer S1 is used by the assistant D3 and supported by the holding arm 8 extending from a lower portion 2 of the top link 1, to be positioned at a right side of the microscope main body 6. The stereo viewer S2 is used by the assistant D2 and supported by the holding arm 9 extending from the lower portion 2 of the top link 1, to be positioned at a rear side of the microscope main body 6. It is noted that the stereo viewer S2 is originally set at a position where a zoomed surgical portion T is observed from the observation direction A. From the position, the stereo viewer S2 is turned about a vertical axis at 180 degrees to be positioned at the rear side of the microscope main body 6. The stereo viewers S1 and S2 are well-known viewers (see Japanese Patent No. 2607828). Each stereo viewer includes a pair of display screens (small size LCDs) therein. The assistant D3 watches a pair of electron images E1 displayed on the pair of display screens through an eyepiece portion to stereoscopically observe a zoomed surgical portion T from the observation direction C. The assistant D2 watches a pair of electron images E2 displayed on the pair of display screens through an eyepiece portion to stereoscopically observe the zoomed surgical portion T from the observation direction B.

A pair of beam introduction holes 10 is formed at a lower portion of a front side of the microscope main body 6. The beam introduction holes 10 are employed to introduce beams L1 and L1 from the surgical portion T into the microscope main body 6. The movable tube 11 is provided at an upper portion of the front side of the microscope main body 6. The movable tube 11 can be tilted up or down. The eyepiece portions 12 and 12 are provided to the movable tube 11. A distance between the eyepiece portions 12 and 12 can be adjusted such that the distance corresponds to a distance between eyes of the main operator D1.

The camera 13 for assistant is provided at an upper portion of the rear side of the microscope main body 6 such that the camera 13 for assistant upward protrudes from the upper portion. The camera 7 for assistant has a substantial L-letter shape in the front view and is provided in the vicinity of the beam introduction holes 10.

Next an optical system in the stereomicroscope system will be described.

The illuminating means illuminates the surgical portion T. The microscope main body 6 is set to be positioned above the surgical portion T. The surgical portion T is shown in FIG. 1 in the form that an arrow mark is drawn on one end of a rear side of a cross and a circle mark is drawn on one end of a right side of the cross.

The pair of beams L1 and L1 which is a part of beams reflected on the surgical portion T and positioned at right and left sides is introduced into the microscope main body 6 through the beam introduction holes 10 along a vertical direction of the microscope main body 6. More specifically, the beams L1 and L1 pass through a non-reflection portion of a prism 14 in the camera 7 for assistant and then are introduced into the microscope main body 6 through the beam introduction holes 10.

First, an optical system of the microscope main body 6 will be described.

It is necessary to obtain a pair of optical images K including a certain binocular disparity in the horizontal direction, when the main operator D1 observes the zoomed surgical portion T from the observation direction A by using the microscope main body 6. Thereby, the pair of beams L1 and L1 is introduced into the microscope main body 6.

As shown in FIG. 3, the microscope main body 6 includes three lenses 15, 16 and 17, a pair of prisms 19 and 19, a pair of zoom optical systems 20 and 20, a pair of prisms 21 and 21, a pair of beam splitters 22 and 22, a pair of lenses 23 and 23, a pair of lenses 24 and 24 and an eyepiece optical system 25 therein. The three lenses 15, 16 and 17 are vertically aligned in the microscope main body 6 and form an objective optical system 18. The zoom optical systems 20 and 20 are disposed in parallel with each other. Each zoom optical system 20 includes two first lenses and two second lenses therein. A diameter of each second lens is smaller than one of each first lens. The two second lenses are movably disposed between the two first lenses. A vertical size of each zoom optical system 20 is smaller than one of a conventional zoom optical system.

The beams L1 and L1 having been introduced into the microscope main body 6 pass through the objective optical system 18 and are focus-adjusted in the objective optical system 18. The beams L1 and L1 having passed through the objective optical system 18 are reflected toward the rear side by the prisms 19 and 19. The beams L1 and L1 having been reflected by the prisms 19 and 19 are introduced into the zoom optical systems 20 and 20.

The beams L1 and L1 having passed through the zoom optical systems 20 and 20 are reflected toward an upper side of the stereomicroscope system by the prisms 21 and 21, and then are split and guided toward the front side by the beam splitters 22 and 22. The beams L1 and L1 having been guided toward the front side by the beam splitters 22 and 22 pass through the lenses 23 and 23 and the lenses 24 and 24, and then are introduced into the eyepiece optical system 25 disposed in the movable tube 11 side in the microscope main body 6. The eyepiece portions 12 and 12 provide an image on the basis of the beams L1 and L1 having passed through the eyepiece optical system 25. Therefore, the main operator D1 can obtain the pair of optical images K including a certain binocular disparity in the horizontal direction as viewed from the observation direction A, and stereoscopically observe the zoomed surgical portion T by his/her naked eyes when the obtained optical images K are introduced into his/her naked eyes. The optical images K each has the form that the arrow mark is positioned on the upper side and the circle mark is positioned on the right side regarding the surgical portion T.

The beams L1 and L1 having been guided toward the upper side to penetrate through the splitters 22 and 22 are introduced into the camera 13 for assistant. The camera 13 for assistant includes a pair of lenses 26 and 26, a pair of lenses 27 and 27 and a camera main body 28 therein. The beams L1 and L1 having been introduced into the camera 13 for assistant pass through the lenses 26 and 26 and the lenses 27 and 27, and then are captured by the camera main body 28. The camera 13 for assistant converts the captured beams L1 and L1 into the pair of electron images E2. Then, the electron images E2 are output into the stereo viewer S2 opposed to the microscope main body 6.

The camera 13 for assistant generates the electron images E2 in the form that the arrow mark is positioned on the upper side and the circle mark is positioned on the right side regarding the surgical portion T, because the camera 13 for assistant captures the beams L1 and L1 from the same direction as the eyepiece portions 12 and 12. However, if the stereo viewer S2 is turned about the vertical axis about 180 degrees and turned about an axis β in the anteroposterior direction, the electron images E2 into which the beams L1 and L1 are converted are also flipped about the vertical axis and the axis β. It is here noted that the term "the stereo viewer S2 is turned about the axis β in the anteroposterior direction" used in this embodiment means that the stereo viewer S2 is turned about the axis β at 180 degrees in the anteroposterior direction.

By carrying out this turn, the assistant D2 can obtain the pair of electron images E2 including a certain binocular disparity in the horizontal direction as viewed from the observation direction B, and stereoscopically observe the zoomed surgical portion T by his/her naked eyes when the obtained electron images E2 are introduced into his/her naked eyes. The electron images E2 each has the form that the arrow mark is positioned on a lower side of the stereomicroscope system and the circle mark is positioned on the right side regarding the surgical portion T. Therefore, the assistant D2 easily performs the assistance for the surgical operation because the form of each electron image E2 is matched to the form of the surgical portion T which the assistant D2 observes from the observation direction B.

Second, an optical system of the camera 7 for assistant will be described.

Figure 4:
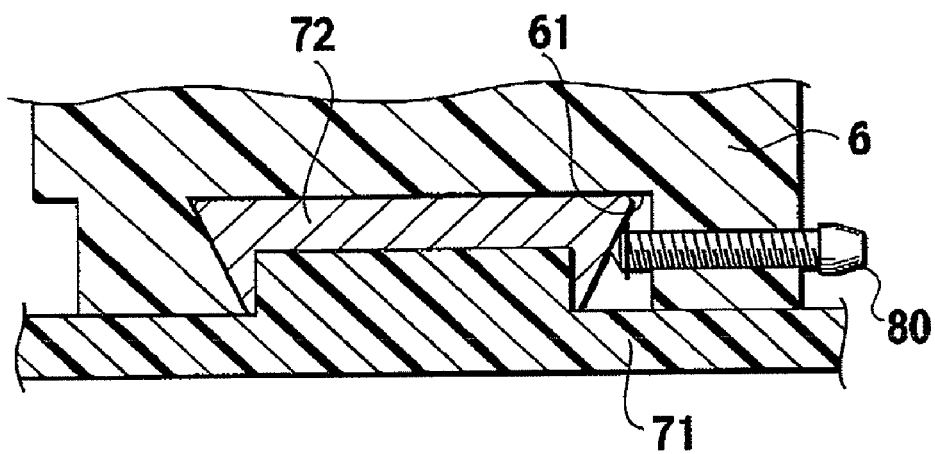
FIG. 4 is a cross-sectional view of the stereomicroscope along the line IV-IV shown in FIG. 1.

The camera 7 for assistant is detachably mounted to the microscope main body 6 in the vicinity of the beam introduction holes 10. As shown in FIGS. 2 and 4, the camera 7 for assistant includes a base portion 71 and a protrusion portion 72. The base portion 71 has a substantial L-letter shape in the plan view. The protrusion portion 72 is made of metal material and fixed to an upper surface of the base portion 71. The protrusion portion 72 surrounds a protrusion portion of the base portion 71. The protrusion portion 72 has tapered surfaces at both sides thereof. The microscope main body 6 has a groove portion 61 at a lower surface thereof. The groove portion 61 has a tapered surface at one side thereof.

In a case where the camera 7 for assistant is mounted to the microscope main body 6, the protrusion portion 72 is received into the groove portion 61. Then, a pin 80 penetrates through the lower portion of the microscope main body 6 and presses the protrusion portion 72 toward the groove portion 61 at a tip end thereof so that one tapered surface of the protrusion portion 72 abuts on the tapered surface of the groove portion 61.

A pair of beams L2 and L2 which is a part of beams reflected on the surgical portion T and positioned at front and rear sides is reflected by a reflection portion 14a of the prism 14 and then are introduced into the camera 7 for assistant side. A reflection means for introducing the beams l12 and L2 into the camera 7 for assistant side is not limited to the prism 14. For example, the reflection means may be a mirror.

As shown in FIG. 3, the camera 7 for assistant includes lenses 29 and 30, a mirror 32, a pair of zoom optical systems 33 and 33, a pair of lenses 34 and 34, a pair of lenses 35 and 35, and a camera main body 36. The prism 14 and the two lenses 29 and 30 are horizontally aligned in the camera 7 for assistant. The two lenses 29 and 30 form an objective optical system 31. The zoom optical systems 33 and 33 are vertically disposed in parallel with each other.

The beams L2 and L2 reflected by the prism 14 pass through the objective optical system 31 and then are reflected upward by the mirror 32. The beams L2 and L2 reflected by the mirror 32 pass through the zoom optical systems 33 and 33 and then are introduced into the camera main body 36 through the lenses 34 and 34 and the lenses 35 and 35. Then, the beams L2 and L2 are captured by the camera main body 36. The camera 7 for assistant converts the captured beams L2 and L2 into the pair of electron images E1. Then, the electron images E1 are output into the stereo viewer S1.

It is noted that the objective optical system 31 and the zoom optical systems 33 and 33 are independent from the microscope main body 6. Therefore, an operator can perform a focus-adjustment and a zoom-adjustment in the camera 7 for assistant by using the objective optical system 31 and the zoom optical systems 33 and 33, without concerning about a focus-adjustment and a zoom-adjustment in the microscope main body 6.

The camera 7 for assistant captures the surgical portion T from the observation direction C which is orthogonal to the observation direction A and positioned at a ride side of the observation direction A. Therefore, the assistant D3 can obtain the pair of electron images E1 including a certain binocular disparity in the anteroposterior direction as viewed from the observation direction C, without turning the stereo viewer S1, and stereoscopically observe the zoomed surgical portion T by his/her naked eyes when the obtained electron images E1 are introduced into his/her naked eyes. The electron images E1 each has the form that the arrow mark is positioned on the right side and the circle mark is positioned on the lower side regarding the surgical portion T. Therefore, the assistant D1 can easily perform the assistance for the surgical operation because the form of each electron image E1 is matched to the form of the surgical portion T which the assistant D1 observes from the observation direction C. For example, if a left hand 37 of the assistant D3 reaches for the surgical portion T from a near side of the assistant D3, the left hand 37 also reaches for the surgical portion T from the near side in the electron images E1 which the assistant D3 observes.

A magnification-adjustment of the optical image K for the main operator D1 is performed independent from one of the electron image E1 for the assistant D3 because the objective optical system 31 and the zoom optical systems 33 and 33 are independent from the microscope main body 6. Therefore, the main operator D1 can effectively perform the surgical operation in cooperation with the assistant D3. For example, the main operator D1 operates a deep portion of the surgical portion T and the assistant D3 operates a shallow portion of the surgical portion T.

In a case where the assistant D3 observes the zoomed surgical portion T from the left side of the main operator D1, firstly, the stereo view S1 and the holding arm 8 are attached to an opposite side (the left side of the main operator D1) of the lower portion 2 of the top link 1 without moving the camera 7 for assistant. Next, the stereo viewer S1 is turned about an axis in the horizontal direction, in order to match the form of each electron image E1 viewed by the stereo viewer S1 to the form of the surgical portion T which the assistant D3 observes from the observation direction D.

Next, the advantageous features of the stereomicroscope system will be described.

Since the microscope main body 6 includes the objective optical system 18, the pair of zoom optical systems 20 and 20 and the eyepiece optical system 25 therein, the main operator D1 can obtain the pair of optical images K including a certain binocular disparity in the horizontal direction as viewed from the observation direction A, by using the eyepiece optical system 25, to stereoscopically observe the zoomed surgical portion T by his/her naked eyes. Thus, the microscope main body 6 includes only minimum optical systems therein, which allows the configuration of the microscope main body 6 to be simply and easily produced.

In a case where the assistant D3 obtain the electron images E1 of the surgical portion T with the stereo viewer S1, the camera 7 for assistant is attached to the microscope main body 6 at the beam introduction holes 10 so as to capture the electron images E1 including a certain binocular disparity in the anteroposterior direction as viewed from the observation direction C and then output the captured electron images E1 into the stereo viewer S1. Therefore, the assistant D3 can observe stereoscopically the zoomed surgical portion T through the electron images E1 from the observation direction C, which is an observation direction of the assistant D3, orthogonal to the observation direction A, which is an observation direction of the main operator D1. As a result, the assistant D3 can easily perform the assistance for the surgical operation.

The camera 7 for assistant is detachably mounted to the microscope main body 6. Therefore, the main operator's view is widened in the vicinity of the microscope main body 6 when the camera 7 for assistant is detached from the microscope main body 6. As a result, the main operator D1 directly observes the surgical portion T by his/her naked eyes from an oblique upper direction of the surgical portion T.

The stereomicroscope system can distribute a large amount of light to the microscope main body 6 in comparison with a conventional stereomicroscope system that includes a sub microscope, which provides a pair of optical images to an assistant, instead of the camera 7 for assistant, which provides a pair of electron images to an assistant, because the camera 7 for assistant does not need a large amount of light.

Although the objective optical system 31 and the zoom optical systems 33 and 33 are independent from the microscope main body 6, these optical systems may be controlled in conjunction with the microscope main body 6. This allows the assistant D3 to observe the surgical portion T at the same magnification as the magnification at which the main operator D1 observes the surgical portion T.

The invention claimed is:

1. A stereomicroscope comprising:
   a microscope main body including therein an objective optical system, a zoom optical system and an eyepiece optical system;
   a camera for assistant detachably mounted to the microscope main body; and
   a stereo viewer provided separated from the microscope main body;
   wherein the microscope main body provides a pair of optical images including a certain binocular disparity as viewed from a first observation direction;
   the camera for assistant provides a pair of electron images including a certain binocular disparity as viewed from a second observation direction;
   the first and second observation directions cross at a certain angle, and
   the camera for assistant outputs the pair of electron images into the stereo viewer;
   the microscope main body includes a linear shaped groove portion provided with a linear shaped tapered surface;
   the camera for assistant includes a linear shaped protrusion portion provided with a linear shaped tapered surface; and
   the camera for assistant is detachably mounted to the microscope main body by receiving the protrusion portion into the groove portion and pressing the protrusion portion toward the groove portion using a pin so that the tapered surface of the protrusion portion abuts on the tapered surface of the groove portion.

2. The stereomicroscope according to claim 1, wherein the first and second observation directions cross at about right angles.

3. The stereomicroscope according to claim 1, wherein the camera for assistant includes an objective optical system and a zoom optical system which are independent from the microscope main body.

4. A stereomicroscope comprising:
  a microscope main body including therein an objective optical system, a zoom optical system and an eyepiece optical system;
  a camera for assistant detachably mounted to the microscope main body; and
  a stereo viewer provided separated from the microscope main body;
  wherein the microscope main body provides a pair of optical images including a certain binocular disparity as viewed from a first observation direction based on a pair of first beams reflected on an observation portion;
  the camera for assistant provides a pair of electron images including a certain binocular disparity as viewed from a second observation direction based on a pair of second beams reflected on the observation portion;
  the first and second observation directions cross at a certain angle, and
  the camera for assistant outputs the pair of electron images into the stereo viewer;
  the microscope main body includes a groove portion provided with a tapered surface,
  the camera for assistant includes an introduction portion introducing the pair of first beams into a beam introduction hole of the microscope main body and a protrusion portion provided with a tapered surface and located away from the introduction portion without surrounding the introduction portion; and
  the camera for assistant is detachably mounted to the microscope main body by receiving the protrusion portion into the groove portion and pressing the protrusion portion toward the groove portion using a pin so that the tapered surface of the protrusion portion abuts on the tapered surface of the groove portion.

* * * * *